United States Patent
Miyata

(10) Patent No.: US 8,099,097 B2
(45) Date of Patent: Jan. 17, 2012

(54) METHOD FOR HANDOVER IN WIRELESS COMMUNICATION, MOBILE ELECTRONIC DEVICE, AND WIRELESS COMMUNICATION HANDOVER SYSTEM

(75) Inventor: Katsuya Miyata, Kanagawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1049 days.

(21) Appl. No.: 11/983,831

(22) Filed: Nov. 13, 2007

(65) Prior Publication Data

US 2008/0119192 A1 May 22, 2008

(30) Foreign Application Priority Data

Nov. 16, 2006 (JP) ................................. 2006-310100

(51) Int. Cl.
*H04W 36/00* (2009.01)
*H04W 4/00* (2009.01)

(52) U.S. Cl. ......... 455/438; 370/331; 370/332; 455/436

(58) Field of Classification Search .................. 370/331, 370/329, 330, 332, 333, 334, 335; 455/436, 455/437, 438, 439, 440, 441, 442, 443
See application file for complete search history.

(56) References Cited

U.S. PATENT DOCUMENTS

| | | | | |
|---|---|---|---|---|
| 5,673,307 A | * | 9/1997 | Holland et al. | 455/436 |
| 5,854,981 A | * | 12/1998 | Wallstedt et al. | 455/439 |
| 6,532,223 B1 | * | 3/2003 | Sakoda et al. | 370/337 |
| 6,556,834 B1 | * | 4/2003 | Kobayashi et al. | 455/464 |
| 6,816,729 B1 | * | 11/2004 | Halonen | 455/436 |
| 7,110,765 B2 | * | 9/2006 | Amerga et al. | 455/436 |
| 7,184,419 B2 | * | 2/2007 | Hwang et al. | 370/331 |
| 7,466,981 B1 | * | 12/2008 | Abdelhamid et al. | 455/438 |
| 7,693,518 B2 | * | 4/2010 | Miyata | 455/436 |
| 2002/0102977 A1 | * | 8/2002 | Shi | 455/437 |

FOREIGN PATENT DOCUMENTS

| | | |
|---|---|---|
| JP | 06-077888 | 3/1994 |
| JP | 11-113044 | 4/1999 |
| JP | 11-285046 | 10/1999 |
| JP | 2000-224646 | 8/2000 |
| JP | 2002-171555 | 6/2002 |
| JP | 2005-175932 | 6/2005 |
| JP | 2006-262178 | 9/2006 |
| JP | 2006-270614 | 10/2006 |
| KR | 2001 0046048 | 6/2001 |
| KR | 2002 0030868 | 4/2002 |

* cited by examiner

*Primary Examiner* — Nick Corsaro
*Assistant Examiner* — Michael S Bush
(74) *Attorney, Agent, or Firm* — Cozen O'Connor

(57) ABSTRACT

A wireless LAN device determines whether there is a necessity to search for a base station based on base station information as to a currently associated first base station, and selects all or a part of base station search conditions stored in advance to search for the base station when there is the necessity for searching the base station. When detecting at least one base station, the wireless LAN device determines whether there is a necessity to execute a handover based on base station information of each of the detected base station and the first base station. If the handover is necessary, the wireless LAN device determines the second base station from the base stations and associates the wireless LAN device with the second base station.

13 Claims, 9 Drawing Sheets

| WIRELESS LAN MODE (P1) | CHANNEL (P2) | NETWORK IDENTIFIER (P3) | NETWORK LOGICAL NAME (P4) | SIGNAL STRENGTH (P5) | ELAPSED TIME AFTER BASE STATION SEARCH (P6) |
|---|---|---|---|---|---|
| b | 1 | MAC ADDRESS 1 | AAA | −65 | 0 |
| b | 6 | MAC ADDRESS 2 | AAA | −65 | 7 |
| b | 11 | MAC ADDRESS 3 | AAA | −70 | 5 |
| b | 3 | MAC ADDRESS 4 | BBB | −75 | 2 |
| a | 36 | MAC ADDRESS 5 | BBB | −70 | 0 |
| a | 40 | MAC ADDRESS 6 | CCC | −75 | 5 |
| a | 44 | MAC ADDRESS 7 | CCC | −75 | 4 |
| b | 2 | − | − | − | 2 |

FIG. 3

METHOD FOR HANDOVER IN WIRELESS COMMUNICATION, MOBILE ELECTRONIC DEVICE, AND WIRELESS COMMUNICATION HANDOVER SYSTEM

BACKGROUND OF THE INVENTION

1. Field of the Invention

The present invention relates to a method for performing a handover in wireless communication, a portable electronic device, and a wireless communication handover system.

2. Description of the Related Art

When a signal received from an access point (a base station), to which a wireless Local Area Network (LAN) device associates, becomes weak, the wireless LAN device becomes unable to maintain the communication. To assure that the wireless LAN link will be maintained, the wireless device switches to newly associate with another base station by performing a process by which the switching event is to take place, and which is called handover (or handoff).

A typical wireless LAN device has a single receiver unit; naturally, the wireless LAN device cannot search access points therearound while keeping the communication link via the currently serving access point. Therefore, the conventional wireless LAN devices release (dissociate) the association when the strength of the signal received from the base station with which the device currently associates is under a certain level, then scans all the available wireless LAN channels, searching for an access point from which the device receives a strong signal, and associates with the detected access point.

The wireless LAN device once releases the current association, and only then it scans all the channels to find a new access point. In this scenario, the wireless LAN device needs a substantial time to complete the handover. Moreover, the wireless LAN device will again be associated with the originally associated access point when it fails to find a new access point, rendering the series of processes end up in the waste.

On the other hand, a wireless LAN device that affords cutting off time to conduct a handover is disclosed in Unexamined Japanese Patent Application KOKAI Publication No. 2005-175932. The disclosed wireless LAN device, on detecting that the level of the signal which it receives from the currently associated base station is smaller than a predetermined value, temporarily interrupts the communication with the currently associated access point, scans the channels and newly associates with a destination after detecting an appropriate channel.

This wireless device stops the communication with the currently associated access point and scans all the channels. Taking a substantial time to scan all the channels, therefore, this wireless LAN device sees large data loss in communicating with the currently associated access point.

A wireless LAN device, which requires shorter time for handover operations, is disclosed in Unexamined Japanese Patent Application KOKAI Publication No. 2006-270614. This wireless LAN device, keeping association with one access point, measures the strength of the signals received from other channels, attempts to perform a handover only to a channel whose signal strength is greater than a threshold value, and stops the subsequent handover operations once it has successfully performed a handover. This wireless LAN device also sees large data loss in communicating with the currently associated access point because this wireless device, similarly to the above-mentioned devices, scans all the channels while temporarily stopping the communication with the associated channel.

Another wireless LAN device is disclosed in Unexamined Japanese Patent Application KOKAI Publication No. 2006-262178, in which the wireless terminal device measures the quality of communication being performed with the adjacent systems for which an order of precedence is determined in advance, and performs handover based on the order of precedence and the measured quality of communication. In advance of the handover, this wireless device measures the quality of the communication being performed by each of the adjacent systems. Therefore, this wireless LAN device also faces the similar problem of data loss in communicating with the currently serving system.

Various mobile terminal devices, not limited to wireless LAN devices, have problems of this kind, which are commonly seen in those mobile terminal devices performing wireless communication via an access point (base station).

SUMMARY OF THE INVENTION

The present invention is made in view of the above-stated circumstances, and seeks to provide a portable electronic device that affords reduced data loss in communicating with its serving access point and affords an appropriate handover, and a method for the handover in wireless communication.

To solve the above-stated problems, the method for handover in wireless communication, is for the handover which takes place to switch a mobile electronic device associating with a first base station and including a wireless communication unit, configured for transmitting and receiving a wireless signal, to associate with and connect to a second base station, and the method comprises the steps of:

a) acquiring base station information as to the first base station;

b) determining whether there is a necessity to search a second base station that is different from the first base station, based on the acquired base station information as to the first base station;

c) selecting a part of a plurality of base station search conditions based on a predetermined criteria, when in the step b) the result of the determination is that there is the necessity to search the second base station;

d) searching for at least one base station in accordance with a selected base station search condition;

e) determining whether to execute the handover based on base station information as to a base station detected in step d) and the base station information as to the first base station; and f) associating the mobile electronic device with the second base station by selecting the second base station from the base stations detected in step d) and switching the mobile electronic device to associate with the second base station, when in step e) it is determined that there is a necessity to execute the handover.

Further, to solve the above problems, the mobile electronic device in the present invention comprises an associator which executes the handover of the associated base station in accordance with the above method for handover in wireless communication.

Further, to solve the above problems, the wireless communication handover system comprises:

the mobile electronic device including an associator which executes the handover of the associated base station in accordance with the above method for handover in wireless communication, a first base station with which the wireless device associates before that the associator switches the association, and a second base station with which the wireless device associates after that the associator switches the association.

According to the method for handover, all or part of the channels can be selected as a target of base station search, by selecting a search condition on searching for a base station which is to be the destination of the handover. This produces reduction of duration time of interruption of the communication.

BRIEF DESCRIPTION OF THE DRAWINGS

These objects and other objects and advantages of the present invention will become more apparent upon reading of the following detailed description and the accompanying drawings in which:

FIG. 3 is a chart conceptually showing the data structure of base station detection results, which are stored in a base station detection results storage area in the wireless LAN device of the embodiment of the present invention;

DETAILED DESCRIPTION OF THE PREFERRED EMBODIMENT

A wireless communication system and a method for a handover in wireless communication according to the embodiment of the present invention will be described. In this embodiment, a mobile electronic device comprises a wireless Local Area Network (LAN) device 1. The wireless LAN device 1 is capable of performing handover between the base stations.

Figure 1:
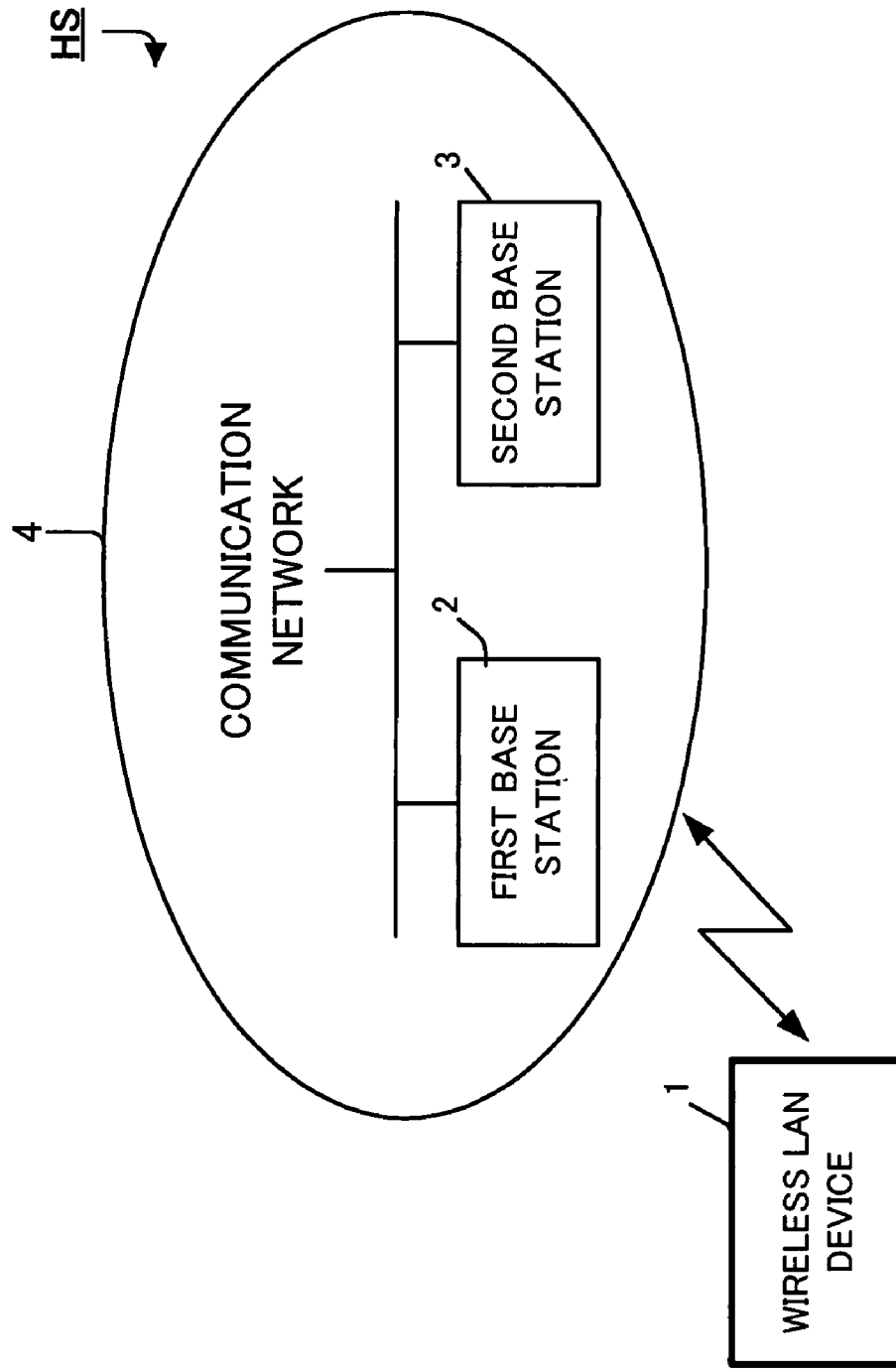
FIG. 1 is a diagram showing a general configuration of the wireless communication handover system according to the embodiment of the present invention.

As shown in FIG. 1, the wireless communication handover system HS of the present embodiment comprises a wireless LAN device 1, a first base station 2, a second base station 3, and a network 4.

The wireless LAN device 1 associates with the first base station 2 and transmits data to an electronic device connected via the network 4.

Figure 2:
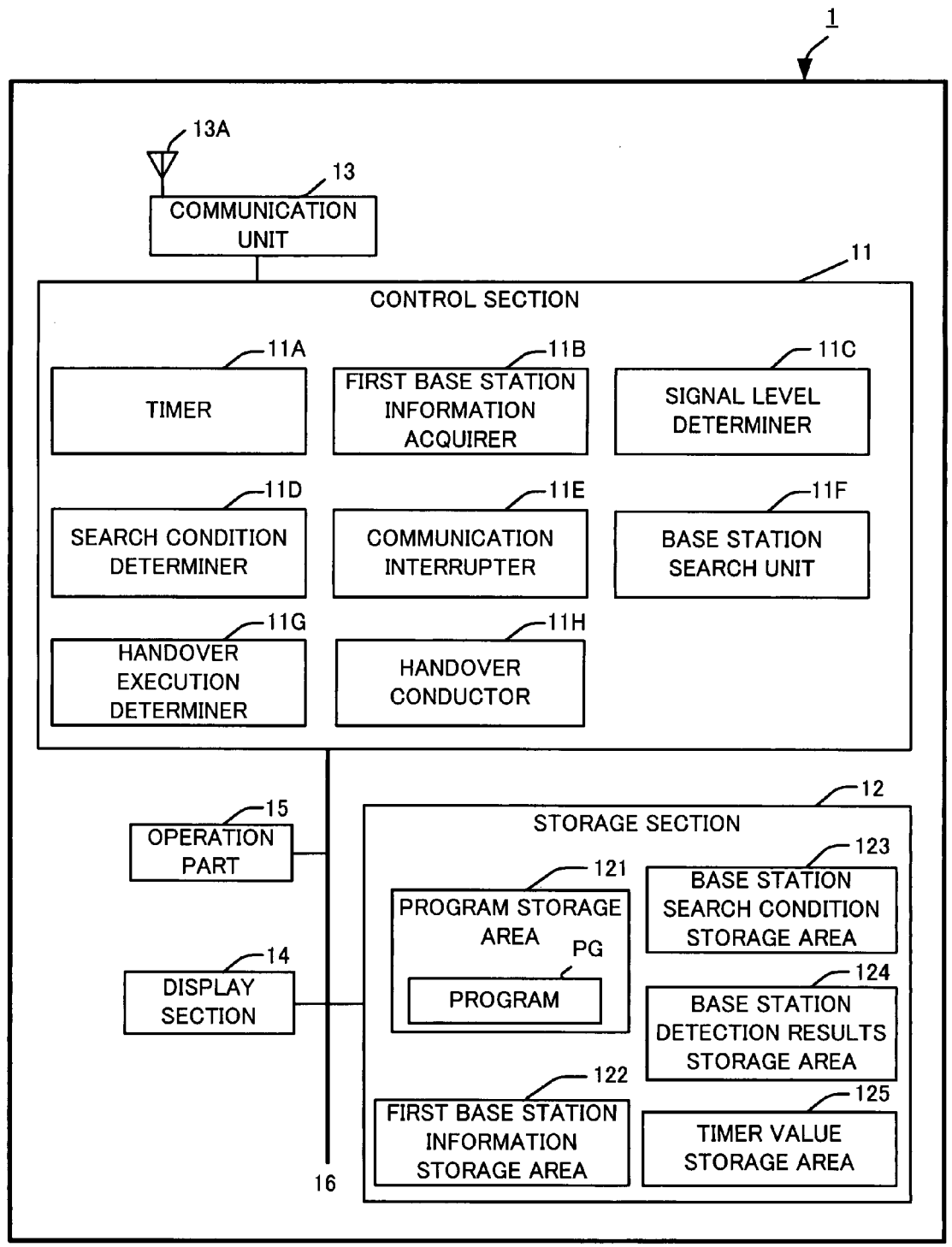
FIG. 2 is a block diagram showing a circuit configuration of the wireless LAN device of the embodiment of the present invention.

As shown in FIG. 2, the wireless LAN device 1 comprises a control section 11, a storage section 12, a communication unit 13, a display section 14, an operating part 15 and a bus 16.

The control section 11 comprises a Central Processing Unit (CPU) or the like. The control section 11 controls the entire operation of the wireless LAN device 1 in accordance with the program PG stored in the storage section 12. For example, the control section 11 performs a handover to be associated with from one to another base stations, etc., in accordance with a program for executing a method for a handover in wireless communication. The control section 11 comprises, functionally, a timer 11A, a first base station information acquirer 11B, a signal level determiner 11C, a search condition determiner 11D, a communication interrupter 11E, a base station search unit 11F, a handover execution determiner 11G and a handover conductor 11H. These elements are implemented by a software programs configured to direct the CPU to perform their respective tasks. The details of these elements are described further below.

The storage section 12 comprises a Random Access Memory (RAM) or a nonvolatile memory, such as a flash memory, and serves as a main memory and a work memory for the control section 11. The storage section 12 comprises, functionally, a program storage area 121, a first base station information storage area 122, a base station search condition storage area 123, a base station detection results storage area 124 and a timer value storage area 125.

Figure 4:
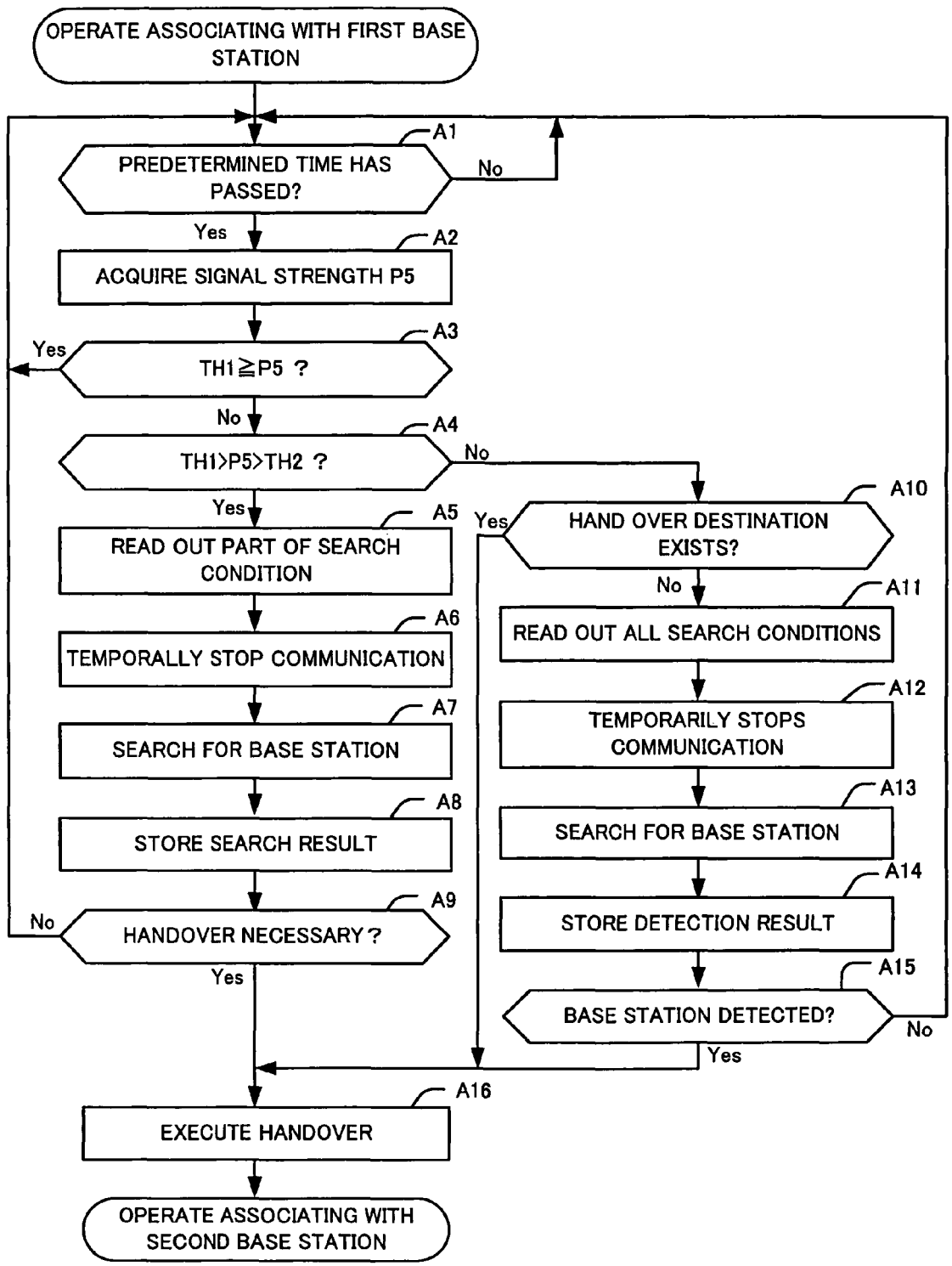
FIG. 4 is a flowchart for explaining the operation of the wireless LAN device of the present embodiment of the present invention performing a handover so that it associates with a new base station.

The program storage area 121 stores a program PG for directing a control section 11 to perform a method for a handover in wireless communication illustrated in the flowchart of FIG. 4.

The first base station information storage area 122 stores first base station information, which is acquired from the first base station by the first base station information acquirer 11B. The first base station information includes information indicating the strength of a signal received from the first base station by the communication unit 13.

The base station search condition storage area 123 stores a plurality of base station search conditions. Each of the base station search conditions, is a condition used by the base station search unit 11F for searching a possible candidate for the second base station 3, which is the destination of the handover.

The base station detection results storage area 124 stores the results of the search for base stations (results of base station search) performed by the base station search unit 11F. The result of base station search is information for specifying a base station, if any, detected by the search performed by the base station search unit 11F, otherwise, for indicating that no base station is detected.

The timer value storage area 125 stores a predetermined reference time for the timer unit 11A to clock time (referred hereafter as "a timer value TM"). The timer value TM is used to keep the count of the lapsed time after that the base station search unit 11F has performed the search for the base station, or to keep the count of the lapsed time after that a beacon is received. A plurality of reference times defined by the timer value TM may be provided, and those values may be different from each other. For example, a timer value TM that defines the interval for receiving the beacon (referred hereafter as beacon reception interval) may be different from that timer value TM that defines the interval for determining the necessity of performing handover (referred hereafter as "handover determination interval").

The communication unit 13 comprises a network interface card, etc. based on IEEE802.11 standard or the like. The communication unit 13 connects the wireless LAN device 1 to the network 4 via an antenna 13A. The communication unit 13 performs, for example, transmission and reception of a wireless signal to and from the first base station 2 or the second base station 3.

The display section 14 comprises a Liquid Crystal Display (LCD) panel of dot matrix type and a driver circuit, etc. and displays any image. For example, the display section 14 displays a wireless channel selected by the operating part 15.

The operating part 15 comprises various kinds of keys or buttons for inputting user instruction or data, and inputs various instructions and data to the control section 11. For example, the operating part 15 can input information for selecting wireless channel in performing that wireless communication.

The bus 16 mutually transfers data between each section, that is, the control section 11, the storage section 12, the display section 14, and the operating part 15.

The first base station 2 represents the base station to which the wireless LAN device 1 currently associates. The first base station 2 periodically transmits a beacon for signaling the presence of itself, to the wireless LAN device 1.

The second base station 3 periodically transmits a beacon for signaling the presence of itself to wireless communication terminal devices therearound.

Next, each component within the control section 11 is specifically described, with reference to FIG. 2.

The timer unit 11A keeps the count of the lapsed time after a given time, referring to the timer value TM stored in a timer value storage area 125. For example, the timer unit 11A keeps the count of the lapsed time after the base station search unit 11F has started the search for a base station. In the present embodiment, a beacon reception interval and a handover determination interval are set as proper values that are determined by the timer value TM. The beacon reception interval and the handover determination interval may have respective values different from one another.

Changing the timer value TM produces, for example, an effect of shortening the duration of interruption, which occurs on searching for the base stations, in the communication with the first base station 2. This point is described later.

The first base station information acquirer 11B acquires first base station information, and makes the acquired information stored in the first base station information storage area 122. The first base station information includes information for specifying the first base station, and other information indicating the strength of the signal received from the first base station information. As for timing, the first base station information acquirer 11B acquires the first base station information each time a time corresponding to the timer value TM passes.

The received signal level determination unit 11C acquires the strength of the signal received from the currently associated base station (received signal strength) P5, compares the signal strength P5 with threshold values TH1 and TH2 to determine which is the larger, and determines if a handover is necessary. Both of the threshold values TH1 and TH2 are reference strengths of the signal which the wireless LAN device 1 receives from the currently associated first base station 2. Being greater than the threshold value TH1, the signal strength P5 represents that the condition of reception is good. On the other hand, being smaller than the threshold value TH2, the signal strength P5 represents that the condition of reception is poor.

The received signal level determination unit 11C determines that there is no need of performing handover when the acquired received signal strength RSSI is greater than the threshold value TH1. If the acquired signal strength P5 is smaller than the threshold value TH1 and greater than the threshold value TH2, the received signal level determination unit 11C determines that the reception of the signal from the currently associated first base station 2 is growing poor.

The search condition determiner 11D determines the condition for searching the base stations, and reads out only the corresponding base station search conditions that correspond, from the base station search condition storage area 123. For example, the search condition determiner 11D can determine the base station search condition so that the base station search is performed in a part of the channels. Or, the search condition determiner 11D can determine the base station search condition such that the base station search is performed in all the channels.

Regarding the base station search condition, a method for specifying a channel is exemplified further below, but the base station search condition is not necessarily limited to this.

The target of search can be only a part of the channels stored in the base station search condition storage area 123, and thereby the time needed for searching the base stations is shortened as compared to when the search is performed over all the channels stored. Accordingly, duration of interruption of communication with the currently associated base station is shortened.

The search condition determiner 11D determines from the base station search conditions so as to accord with the priority level assigned to the channels. In the present embodiment, the priority levels assigned to the channels are determined in advance. Specifically, the priority levels are assigned to the channels so that the channel number 1 is assigned the highest priority order, and the priority level decreases with the increasing channel number. That is, when the search is performed by the base station search unit 11F on a given channel, then the channel with the next channel number is assigned a highest priority order in the next base station search.

Further, the search condition determiner 11D extracts the number of target of the base station search, from the channels assigned with the priority levels. In the present embodiment, the number of channels extracted as the target of the base station search is predetermined. Specifically, three channels are read each time the base station search is performed. That is, the search condition determiner 11D determines the base station search condition so that the base station search unit 11F initiates the base station search from the channel 1, to which the highest priority level is assigned, so as to conduct the search in three channels, in the ascending order. The search condition determiner 11D reads out a search condition from the base station search condition storage area 123. The maximum value of the time duration of the base station search performed for one channel each is predetermined, as a maximum base station search duration time.

Changing the methods of assigning the priority level to the channel, or changing the method of determining the number of channels, can reduce the time needed for searching a base station, to which the communication is reconnected by the handover. The details of the method of assigning the priority level to the channel and the method of determining the number of channels are described later.

The communication interruption unit 11E directs the operation of the communication unit 13 to temporarily interrupt the communication with the currently associated first base station, for the base station search unit 11F to initiate the search for the base stations.

The base station search unit 11F searches for new base stations and stores a result of base station search, which includes the resultant base stations, in the base station detection results storage area 124. When the base station search unit 11F searches out a base station, the information of the detected base station (base station information) is stored to the base station detection results storage area 124. On the other hand, when the base station search unit 11F does not searched out any base station, the base station search unit 11F stores information indicating that no base station is detected, in the base station detection results storage area 124.

As a method for acquiring the base station information by the base station search, for example, a scanning process specified by the IEEE802.11 standard can be adopted. In this case, in order to reduce the time needed for the scanning process, the wireless LAN device 1 on active scan mode in which it sends a probe request to the base station, and receives a probe response from the base station. Further, for suppressing power consumption, a passive scan may be adopted, in which the wireless LAN device 1 does not send that probe request, and receives a beacon from the base station.

The handover execution determiner 11G determines the necessity of the handover based on the result of the determination by the received signal level determination unit 11C and the base station detection results which indicates the results of the detection by the base station search unit 11F, and determines the presence or absence of the destination of reconnection by the handover.

When a handover execution determiner 11G determines that the handover is necessary, the handover conductor 11H performs the handover from the currently associated first base station 2, to the second base station 3 that is the destination of the handover.

Referring to the illustration of FIG. 3, the data structure of the base station detection results, which are detected by the base station search unit 11F, and stored to the base station detection results storage area 124, are described.

One record of the base station detection results includes the items shown in one horizontal line of the table of FIG. 3, that is, the wireless LAN classification P1, the channel P2, the network identifier (Basic Service Set Identifier, BSSID) P3, and the logical name in the network (Service Set Identifier, SSID) P4, the signal strength (Received Signal Strength Indicator, RSSI) P5, and the elapsed time after base station search P6.

The wireless LAN classification P1 indicates which protocol of 11*a*, 11*b* and 11*g*, etc., the LAN system searched out by the wireless LAN device 1 uses. In other words, the wireless LAN classification P1 indicates in which frequency band the scanning is performed.

The channel P2 indicates the channel in which the wireless LAN device 1 performed the base station search. From the wireless LAN classification P1 and the channel P2, the frequency band in which the base station search unit 11F preformed the base station search is specified.

The search condition determiner 11D assigns a priority level to each channel P2. In the present embodiment, the 14 channels are scanned in the ascending order from 1 to 14, and the base station search is performed in three channels each time.

The network identifier (Basic Service Set Identifier, BSSID) P3 is for identifying the base station detected in the channel scanned by the base station search unit 11F. In the present embodiment, the network identifier P3 is the same as the Media Access Control (MAC) address of the base station.

The logical name in the network (Service Set Identifier, SSID) P4 is the logical name of a network, which is added for the sake of convenience in identifying each base station. The wireless LAN device 1 communicates only with a base station whose logical name in the network coincides with any of the logical names P4 in the network stored in the storage section 12.

The received signal strength (Received Signal Strength Indicator, RSSI) P5 indicates the latest received signal strength of the signal received from the base station detected by the base station search unit 11F.

The elapsed time after base station search P6 indicates the lapsed time after a signal having a strength, which is indicated by the signal strength P5, is last detected.

As shown in the record of the eighth line of FIG. 3, when no base station is detected even by the scanning performed by the base station search unit 11F, the base station search unit 11F stores only the wireless LAN classification P1, the channel P2, and the elapsed time after base station search P6, in the base station detection results storage area 124. A record after lapse of predetermined time after being stored in the base station detection results storage area 124 may be deleted by the control section 11.

Referring next to the flowchart of FIG. 4, the handover of wireless LAN device 1 from the first base station 2 to the second base station 3 will be described.

Here, it is premised that the wireless LAN device 1 associates with the first base station 2 and periodically and normally receives a beacon. When the wireless LAN device 1 normally receives the beacon, the association process and the authentication process specified by the Institute of Electrical and Electronic Engineers (IEEE)802.11 standard between the wireless LAN device 1 and the first base station 2 have been completed.

Further, here, the wireless LAN device 1 is on the way of performing the process shown in the flowchart of FIG. 4.

The timer 11A, for determining the necessity of the handover, determines whether the lapsed time after that the first base station information transmitted by the first base station 2 is acquired in previous time has reached a value corresponding to the timer value TM set in advance (step A1). When the lapsed time has not reached the value corresponding to the timer value TM (No in step A1), the process returns to step A1 and the counting of the lapsed time is continued.

When it is determined that the lapsed time has reached the timer value TM (Yes in step A1), the first base station information acquirer 11B directs the communication unit 13 to receive the signal received from the currently associated base station (first base station 2).

The first base station information acquirer 11B derives the strength of the received signal (received signal strength) P5 (step A2). The first base station information acquirer 11B generates the first base station information including the signal strength P5, and stores the generated information to the first base station information storage area 122.

Then, the received signal level determination unit 11C acquires the signal strength P5 and determines which is the larger, of the signal strength P5 and the predetermined threshold values TH1 and TH2 (TH1>TH2) (steps A3 and A4).

The received signal level determination unit 11C, initially, determines whether the signal strength P5 is equal to or greater than the threshold value TH1 (Yes in step A3). When the signal strength P5 is equal to or greater than the threshold value TH1 (step A3 ;Yes), the received signal level determination unit 11C determines that the handover process is not necessary. In this case, the control section 11 gets the process back to step A1, and continue the operation while associating with the first base station 2.

If the signal strength P5 is less than the threshold value TH1 (No in step A3), the received signal level determination unit 11C specifies whether the signal strength P5 is greater than the threshold value TH2 (step A4). When the signal strength P5 is equal to or smaller than the threshold value TH2 (No in step A4), the control section 11 gets the process back to the sequence of steps A10 to A15. The details of steps A10 to A15 are described later.

When the signal strength P5 is less than the threshold value TH1 and greater than the threshold value TH (Yes in step A4), the search condition determiner 11D determines (selects) the base station search condition, and reads out only the corresponding base station search condition from the base station search condition storage area 123 (step A5). Here, it is assumed that the search condition determiner 11D selects one search condition according to which the search is performed by three channels in an ascending order of the number thereof (channel number).

The communication interruption unit 11E directs the communication unit 13 to temporality interrupt the communication with the first base station 2 (step A6). Then, the base station search unit 11F searches for a new base station in accordance with the search condition set in step A5 (step A7). In the above-described example, the base station is searched in the order of: channel 1, channel 2, and channel 3 in accordance with the selected base station search condition.

The base station search unit 11F, when finishing the base station search process, stores the base station detection results in the base station detection results storage area 124 in the form shown in FIG. 3 (step A8).

The handover execution determiner 11G, based on the base station detection results and a predetermined criteria, determines if the handover is necessary (Yes in step A9). The predetermined criteria is described later. When it is determined that the handover is not necessary (No in step A9), the control section 11 gets the process back to step A1, and continue the operation under the first base station 2.

In the case where it is determined that the handover is necessary (step A9; Yes), handover conductor 11H performs the association process to associate with the second base station 3, which is selected as the appropriate destination of reconnection (step A16). In advance of the association process, the association with the first base station 2, which is currently associated, may be released. After this, the wireless LAN device 1 operates under the second base station 3, which is the destination of the handover.

On the other hand, in step A4, if the signal strength P5 is equal to or less than the threshold value TH2 (No in step A4), the handover execution determiner 11G refers to the base station information stored in the base station detection results storage area 124, and determines the presence or absence of the destination of the handover to which the communication is reconnected (step A10).

When there is any destination of the handover (Yes in step A10), the handover conductor 11H performs an association process to be associated with the base station selected as the destination of the handover (step A16).

If there is no destination of the handover (No in step A10), the search condition determiner 11D reads out all the base station search condition stored in the base station search condition storage area 123 (step A11). The communication interrupter 11E directs the communication unit 13 to temporarily stop the communication with the first base station 12 (step A12). Then, the base station search unit 11F attempts to detect a new base station in all the channels (step A13). The base station search unit 11F, when finishing all the base station search processes on all of the base station search conditions selected in step A11, stores the base station detection results in the base station detection results storage area 124 (step A14).

The handover execution determiner 11G, referring to the base station detection results, determines whether the base station search unit 11F has detected any base station (step A15). When no base station is detected (No in step A15), the control section 11 gets the process back to step A1, and continue the operation under the first base station 2.

When any base station is detected (Yes in step A15), the handover conductor 11H performs an association process to associate with the second base station 3 selected as the destination of reconnection (step A16). The wireless LAN device 1 operates under the second base station 3 that is the destination of the handover.

In step A16 when the association process to associate with the second base station 3 is not normally finished, the wireless control section 11 newly performs the base station search process for all the channels in accordance with all the available base station search conditions, to search for other base stations.

If, according to the determination process of the steps A3 and A4, the signal strength P5 is becoming weak (threshold value TH1>signal strength P5>threshold value TH2), the wireless LAN device 1 performs the base station search for a part of all the channels. On the other hand, when the signal strength P5 is remarkably weak (threshold value TH2≧signal strength P5), the control section 11 performs the base station search for all the channels.

By doing so, the control section 11 can perform the base station search, with changing the number of the channels which are the target of the base station search, depending on the degree of the weakness of the signal strength P5.

When the signal strength P5 is remarkably weak (threshold value TH2≧signal strength P5), the control section 11 performs the handover after determining whether there is any destination of the handover by the determination process. By doing so, the control section 11 can perform the handover in a short time.

Further, when no destination of the handover is detected in the determination process of step A10, the control section 11 performs the base station search based on all the base station search conditions and in accordance with the processes of steps A11 to A15.

Accordingly, the possibility that the control section 11 detects a candidate base station which is to be the destination of the handover is increased.

Next, referring to FIGS. 4 and 5, a process flow until the wireless LAN device 1 of the present embodiment performs the handover from the currently associated first base station 2 to the second base station 3 will be described.

Figure 5:
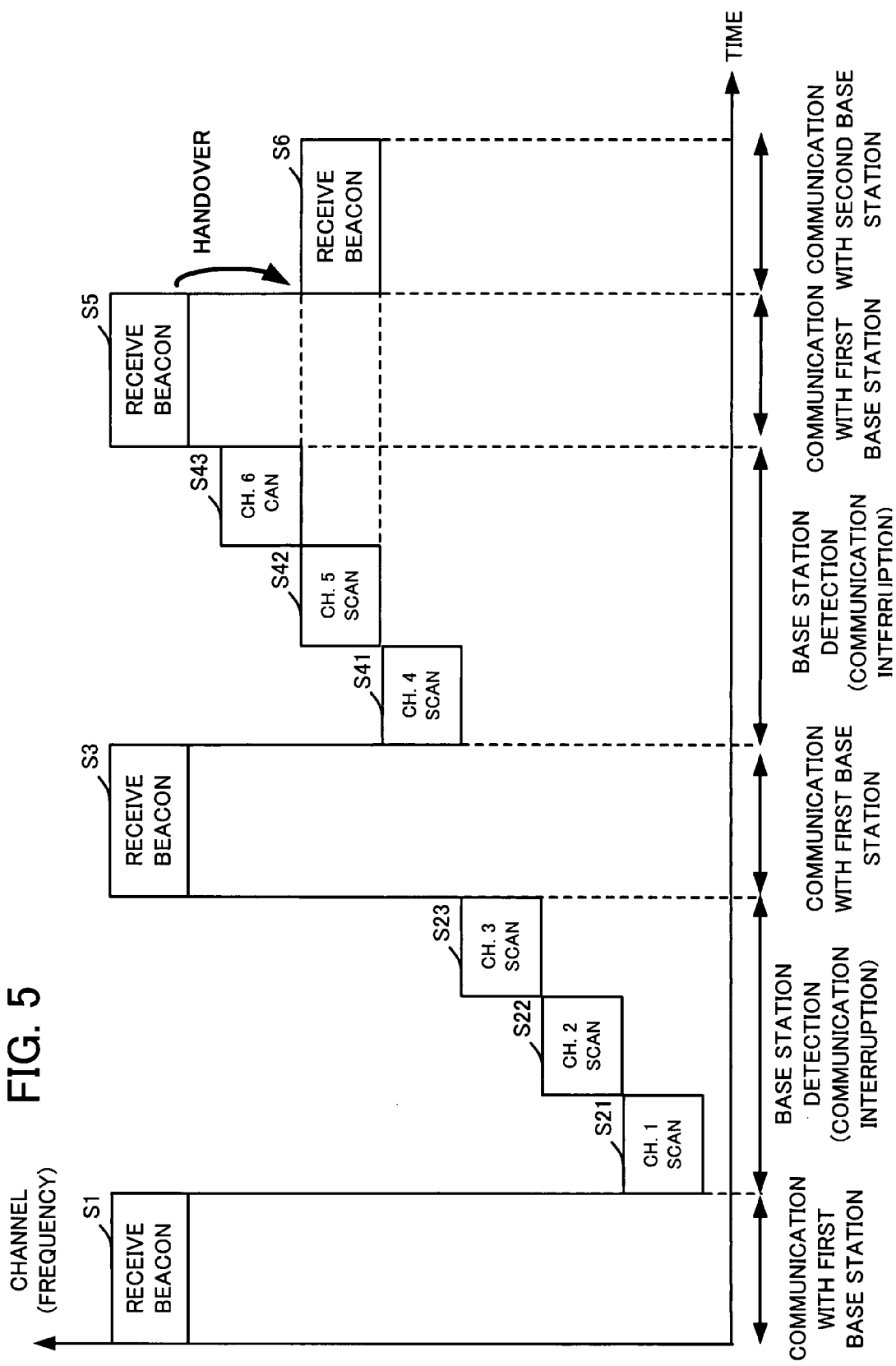
FIG. 5 is a diagram showing a chart showing the flow of handover performed by the wireless LAN device 1 of the present embodiment from the currently associated first base station 2 to the second base station 3, wherein the horizontal axis represents the elapsed time.

The process flow until the wireless LAN device 1 of the present embodiment completes handover from the currently associated first base station 2 to the second base station 3 is shown in FIG. 5, where the horizontal axis represents the passage time, and where the vertical axis represents the channel.

In steps S1, S3 and S5 the control section 11 periodically receives a beacon from the first base station 2, and performs transmission and reception, etc. of data frames to and from the first base station 2.

In step S1, during the communication with the first base station, the control section 11 acquires the signal strength P5 (step A2), and compares the acquired signal strength P5 and the threshold value TH1 and TH2 (steps A3 and A4). If, the result of the determination is: TH1>P5>TH2 (Yes in step A4), the control section 11 reads out a part of the search conditions from the storage section 12. Here, it is assumed that the read-out search condition indicates that the scanning should be performed only for channels 1 to 3. The control section 11 temporarily interrupts the communication (step A6) to search the base station, by individually and sequentially searching in the wireless LAN channels 1 to 3 in the numerical order, in accordance with the search condition (step S21 to S23). The control section 11 stores the result of search in the storage section 12, as shown in FIG. 3.

The time for the processes of steps S21 to S23 for base station search, is the duration time of the interruption of the communication with the first base station 2. As the number of channels for which the base station search is performed increases and as the duration time of the base station search per one channel becomes longer, the duration time of the communication interruption becomes longer, while the possibility of detecting a base station, which is to be the destination of reconnection by the handover, increases.

When the base station search (steps A7 and S21 to S23) finishes, the control section 11 resumes to the condition in which it communicates with the first base station 2 (step S3).

Then, the control section 11 determines the necessity of the handover (step A9), and when it is determined that there is no need of the handover (No in step A9), returns to step A1 without performing the handover.

During the communication with the first base station 2 in step S3, the control section 11 compares the signal strength P5 with the threshold values TH1 and TH2 (steps A2 to A4). If the result of the determination is: TH1>P5>TH2 (Yes in step A4), the control section 11 reads out a part of the search conditions from the storage section. Here, it is assumed that the read-out search condition indicates that the scan should be performed only for the channels 4 to 6. The control section 11 temporarily interrupts the communication (step A6), and searches the base station (steps A7 and S41 to S43) by individually and sequentially searching in the wireless LAN channels 4 to 6 in their numerical order (step S41 to S43). In this way, by repeating the base station search operation periodically, the control section 11 can finish all the base station search processes on the entire base station search conditions. Further, by appropriately changing the search condition, more channels can be searched in.

When the base station search (steps A7 and S41 to S43) finishes, the control section 11 resumes to the condition in which it communicates with the first base station 2 (step S5).

Then, the control section 11 determines the necessity of the handover (step A9), and when it determines that there is no need of the handover (No in step A9), returns to step A1 without performing the handover.

During the communication with the first base station 2 in step S5, the control section 11 compares the signal strength PS with the threshold values TH1 and TH2 (steps A2 to A4). If the received signal strength of the signal from the first base station 2 is remarkably weak and the result of the determination by the received signal level determination unit 11C is: TH2>PS (No in step A4), the control section 11 then determines the presence or absence of the destination of the handover (step A10). That is, the control section 11 refers to the base station detection results (FIG. 3) of the detection in steps S21 to S23 and S41 to S43 (and, if any, search processes performed prior to those steps).

Here, it is assumed that the result of determination is that the signal strength P5 of the signal received from the second base station 3, which is detected in the base station search in step S42, is the largest and satisfies the condition of the handover. Then, the control section 11 dissociates from the first base station 2, and performs a process to associate with the second base station 3.

After this, the wireless LAN device communicates with the second base station.

As described above, the wireless LAN device 1 of the present embodiment temporarily interrupts the communication with the currently associated base station before conducting the handover, and then searches for a base station and collects information. Moreover, it does not search for base stations in all the channels in a search process of one time, but searches in a part of the channels. This only takes a short duration of interruption in the communication with the base station. Further, by performing the search with changing the search conditions, the terminal device can search in all or many of the channels.

Then, the specifics of the processes in the above-referenced flowchart of FIG. 4 will now be explained.

In the following, examples where: i) the timer value in step A1 is changed; ii) the base station search condition in step A5 is selected; iii) the necessity of performing the handover in step A9 is determined; and iv) the presence or absence of the destination of the handover in step A10 is determined.

First, an effect obtained by changing the timer value TM, which is used as a reference value when the timer unit 11A counts the lapsed time in step A1 will be described.

In the first example, if the signal strength P5 of the currently associated base station is high, the control section 11 changes the timer value TM that defines the handover determination interval, depending on the signal strength P5, in order to secure a longer handover determination interval. On the other hand, if the signal strength P5 is low the control section 11 reduces the length of the handover determination interval by changing the timer value TM. Accordingly, when the reception of the signal from the first base station is good, the number of times of execution of the base station search is reduced, therefore shortening the process time.

The timer value TM can be changed by a given method. Possible examples of those methods may be as follows: i) Storing a plurality of candidates for the timer value TM in the storage section 12, and subsequently selects an appropriate one; ii) comparing the received signal strength P5 with the reference value, and incrementing or decrementing the time timer value TM by a difference $\Delta$TM in accordance with the result of the comparison; and iii) deriving a value by multiplying a count by a value obtained by deriving the difference between the signal strength P5 and the reference value, and the like.

As the second example, the timer value TM is changed so that the handover determination interval is extended if in the base station detection results detected by the base station search unit 11F in step A7 there is any base station having a signal strength P5 greater than a threshold value; otherwise, the timer value TM is changed so that the handover determination interval is shortened.

By this operation, the number of time of performance of the base station search is increased when no candidate for the handover is detected, to thereby increase the possibility of detecting a destination of the handover.

As the third example, the timer value TM is changed so that a larger handover determination interval is secured, if more than a predetermined number of base stations whose signal strengths are larger than the signal strength P5 of the currently associated base station, are detected; otherwise, the timer value TM is changed so that the handover determination interval is shortened.

In this way, it becomes possible to increase the times of performance of the scanning operation when no candidate for the handover is detected, thereby suppressing the possibility that the handover process ends up in failure.

Next, an explanation is given of a method for selecting a channel to be the target of base station search in step A5 of FIG. 4, as a method for electing the base station search condition. In step A5, the wireless LAN device 1 selects only a part of the entire available channels. In performing the selection of the channels, first, a priority level is assigned to the each channel.

A first method for assigning a priority level to each channel is as adopted in the present embodiment wherein the order of priority level is predetermined. For example, the priority order of channels in the base station search is assigned in the ascending order from 1 to 14 or a descending order from 14 to 1, or a random order of: 1, 6, 11, 14, 2, 7, 12 . . . , etc.

The example of FIG. 5 is in the ascending order. Here, when the base station search is performed in a given channel, then the channel with the next priority is most priority subjected to the next base station search.

In the descending order, when in a given search process the channels 14 to 12 are subjected to the base station search, in the next base station search the subjects are the channels 11 to 9.

A second method for assigning a priority level to each channel is by according to the order of date and time after being stored of the base station information, among the base station detection results stored in step A9. For example, if the base station detection results are as shown in FIG. 3, channel 6 of which lapsed time after the base station search is the longest (here 7) is assigned a primary priority level, and channels 11 and 40, of which lapsed time is the second longest, here 5, is assigned a secondary priority level.

According to this method, the records are updated in the order of their date and time, and then comparatively new records are constantly stored as the scanning results. This narrows the gap between the base station detection results stored in the base station detection results storage area 124 and base station detection results to be obtained when the base station search is actually performed for all the channels. Accordingly, an appropriate destination of the handover can be detected in a short time as compared to the case where all the channel is subjected to the base station search.

Additionally, a channel whose record does not exist on the result of base station search of FIG. 3, including a channel for which base station search is never performed and a channel whose record is deleted due to the elapse of predetermined time after the base station search, can be given the highest priority. Also in this way, the wireless LAN device 1 can detect an appropriate destination of the handover with shorter time than that in the case where the base station search is performed in all the channels.

The third method for assigning a priority level to each channel is by assigning a priority level to each base station in the decreasing order of the signal strength P5 of the results of the base station search stored in step A8. For example, in the base station detection results of FIG. 3, channels 1 and 6 whose received signal strengths P5 are the greatest (−65) are given the primary priority, and channels 11 and 36, whose received signal strengths P5 are the second greatest (−70) are given the secondary priority. In the third method, base stations having large received signal strengths P5 but included in other channels cannot be detected. However, the information about the base stations having comparatively large signal strength P5 are constantly retained newest. Accordingly, the wireless LAN device 1 can detect a candidate for the handover in a short time as compare do the case where the base station search is performed in all the channels.

A threshold value TH3 is determined in advance as a reference strength for excluding a base station, the signal strength of which is weak. Then, on the basis of the base station detection results, priority may be assigned to the channels including a base station whose signal strength P5 is greater than the threshold value TH3, in the decreasing order of the signal strength P5. By doing so, the wireless LAN device 1 can detect a destination of handover whose reception condition is better, without performing any base station search in a channel that includes base stations whose signal strength P5 is equal to or less than the threshold value TH3, which is a bad reception condition.

The fourth method of assigning a priority level to each channel is a combination of the first to third methods.

For example, of the base station detection results, a channel used by a base station whose signal strength P5 is the greatest and greater than the threshold value TH3 (the channels determined in accordance with the third method) is given the primary priority. Then, of the records the channel whose lapsed time after the base station search is the longest (the channel determined in accordance with the second method) is given the secondary priority. And then, the channel with the next in a predetermined priority order (the channel determined in accordance with the first method) is assigned a tertiary priority.

Any two of the first to the third methods may be combined. In any of the examples, the wireless LAN device 1 can detect with a shorter time, more appropriately, an appropriate destination of the handover as compared to the case where all the channels are subjected to the base station search.

Further, a method for determining the number of channels for which the base station search is performed, in step A5 where the search condition determiner 11D determines the base station search condition, will be described.

The first example of the methods of determining the number of channels is determining the number of channels in advance. As adopted in the present embodiment, 3 channels may be searched each time the base station search is performed, or, a fixed cycle of base station search processes with different number of search targets, may be performed, that is, the cycle of searches performed in: 4 channels, 4 channels, then 3 channels, and 3 channels, may be adopted.

Further, the number of channels of the base stations searched in the transmission and reception of the data frame may be less than the number of the channels of the base stations searched during the period in which the beacon is received. Accordingly, the wireless LAN device 1 can reduce the time of the base station search during the data transmission and reception. Further, in order to perform a base station search by passive scan, a waiting time for receiving the beacon from the base station becomes necessary. Therefore, the base station search relying on the passive scan might require a longer time than is required in an active scan based base station search. Therefore, in searching a base station by passive scan, the number of searched channels per one time of the base station search process may be reduced. By doing so, the wireless LAN device 1 can reduce the duration of interruption of communication caused in order to perform the base station search.

On the other hand, in the base station search by active scan, the time needed for the base station search can be reduced by reducing the maximum value of the base station search. Further, the maximum time length of the base station search may be different for each channel.

As a second example of the determination of the number of channels, there is a method in which the total maximum base station search duration time and the maximum base station search duration time for each channel are determined in advance and then the maximum number of channels, which can be searched within the total maximum base station search duration time, is calculated. In this method, the maximum base station search duration time for each channel is set to a predetermined value.

In a base station search relying on active scan, the total maximum base station search duration time is reduced by reducing the maximum base station search duration time for each channel. Accordingly, the duration time of the interruption of the communication with the base station is reduced even if the number of channels to be subjected to the base station search of one time is increased.

By setting the total maximum base station search duration time to be smaller than the reception interval of the periodical reception of the beacon, the wireless LAN device 1 can finish the base station search without interrupting receiving the beacon from the currently associated first base station 2. Further, by setting the total maximum base station search duration time during the transmission and reception of the data frame so as to be shorter than the total maximum base station search duration time, the duration time of interruption of communication during the transmission and reception of data frame can be reduced.

The base station search condition in the present embodiment is determined from channel priority level information that associates the channels with their assigned priority levels, and from the search target channel number information indicating the number of channels for which the search is performed when the base station search unit 11F performs a process to search the second base station 3.

The base station search unit 11F searches for a base station in accordance with the base station search condition determined by the search condition determiner 11D and read out from the base station search condition storage area 123.

The channel priority level information and the search target channel number information may be changeable by user operation. By the adoption of the configuration, the wireless LAN device 1 allows a user to make a change so that the wireless LAN device 1 increases the number of channels in which it searches for a base station when, for example, the user judged that the signal strength reviewed from the currently associated base station has become weak. Accordingly, the device of this embodiment increases the possibility to detect a base station to be a candidate for the destination of the handover.

Figure 6:
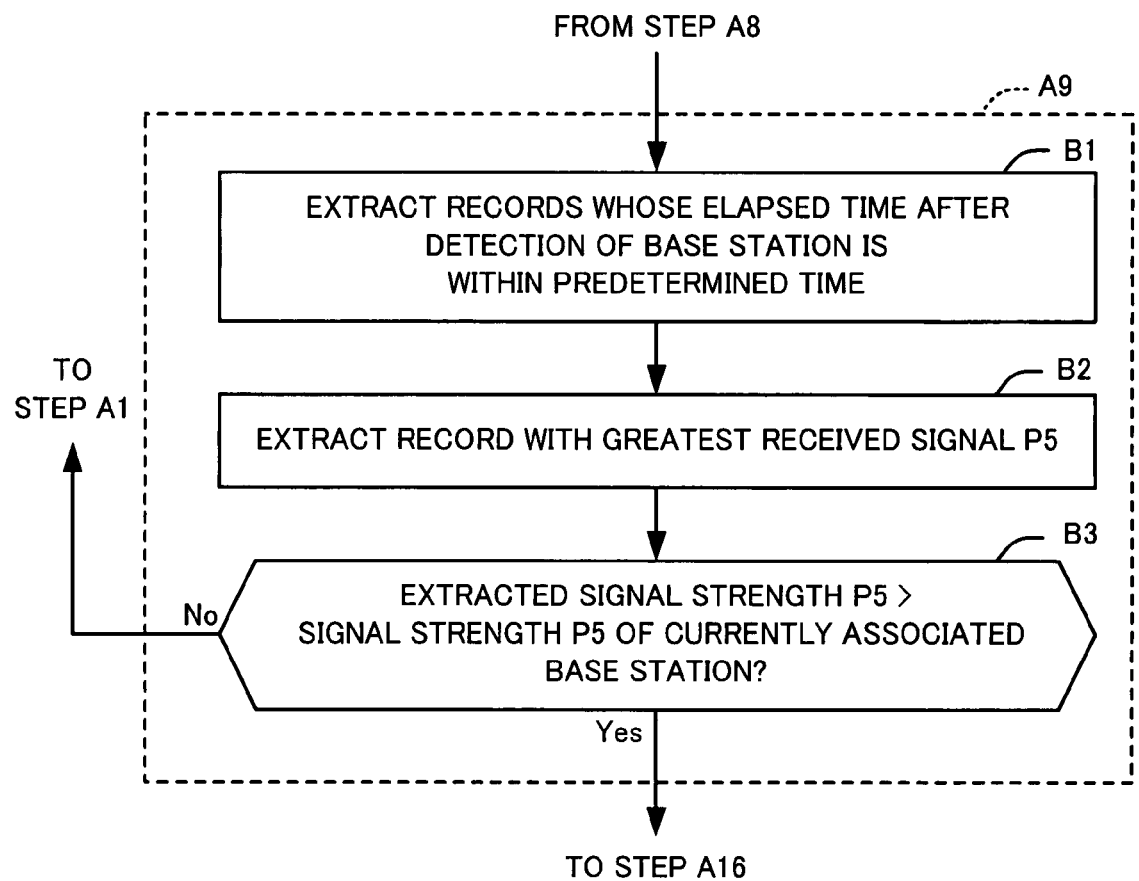
FIG. 6 is a flowchart showing a first example of a process in step A9 of FIG. 4 for determining a base station search condition.
Figure 7:
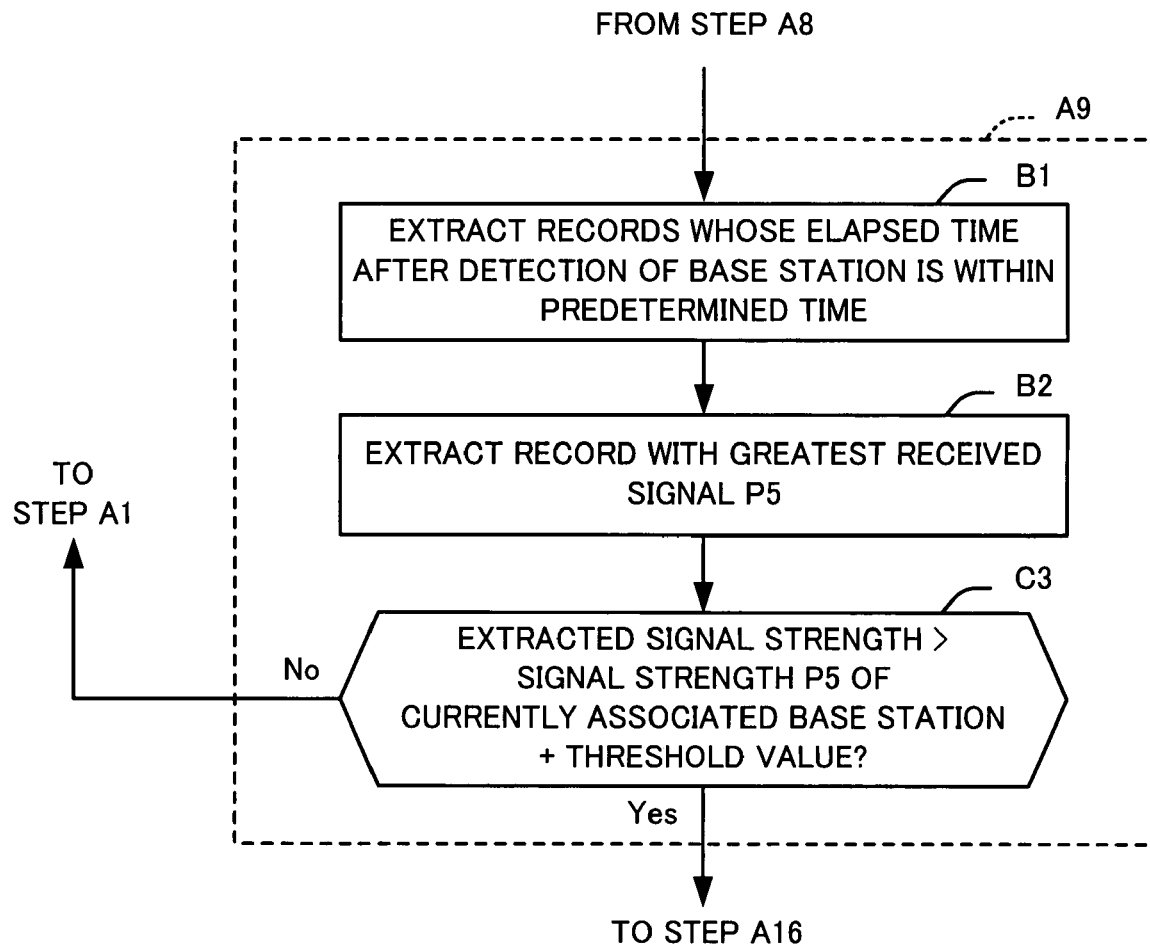
FIG. 7 is a flowchart showing a second example of the process in step A9 of FIG. 4 of determining the base station search condition.
Figure 8:
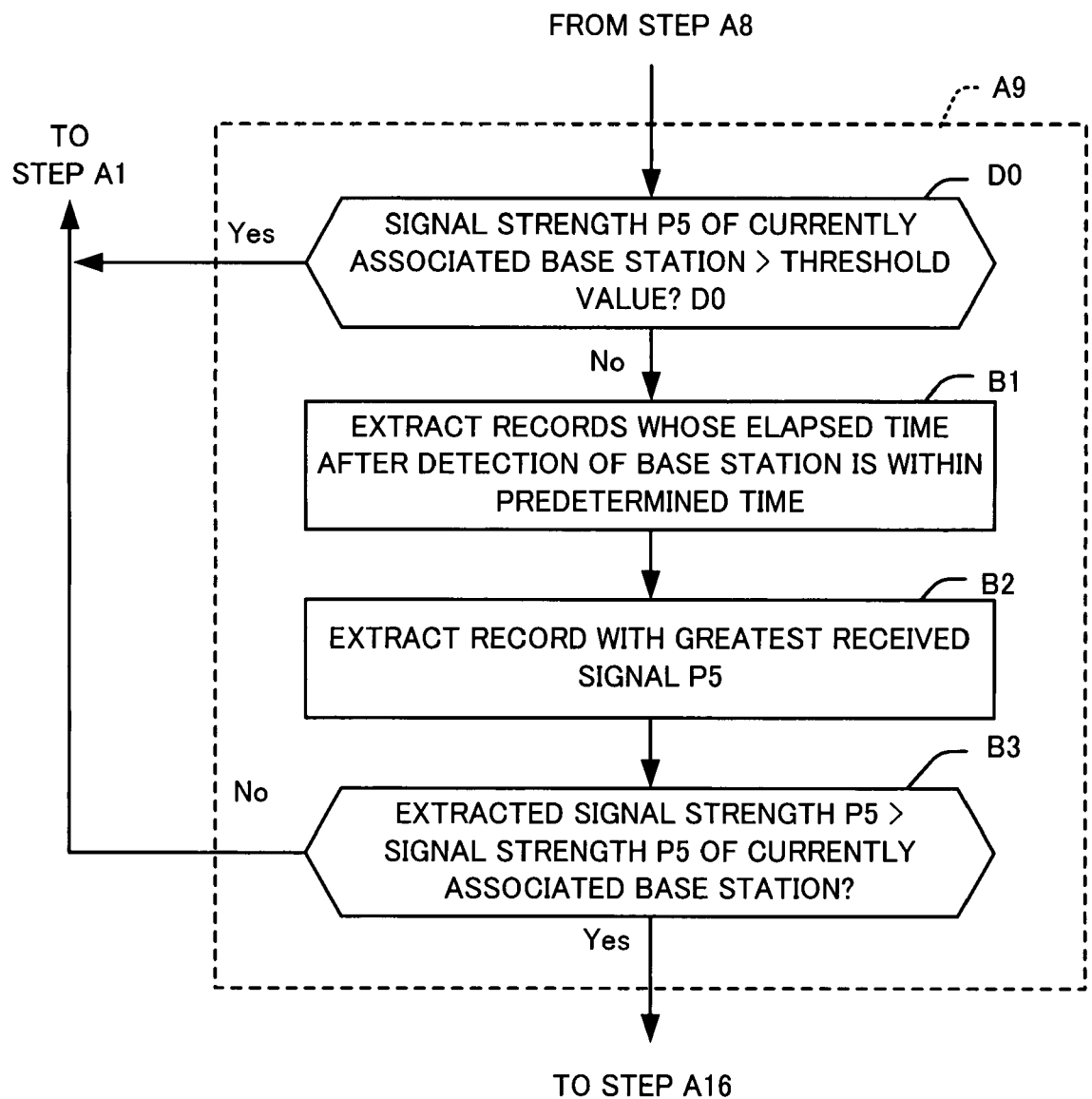
FIG. 8 is a flowchart showing a third example of the process in step A9 of FIG. 4 of determining the base station search condition.

Referring now to flowcharts shown in FIGS. 6 to 8, explanations are given of three examples of the process to determine the necessity of performing the handover, in step A9 of FIG. 4.

The first example of the process of determining the necessity of performing the handover is, as shown in the flowchart of FIG. 6, based on the result of comparison as to which is the larger, of the extracted signal strength P5 and the signal strength P5 of the currently associated base station.

The control section 11 extracts, from the records stored in the results of base station search storage area 124, a record whose elapsed time after base station search P6 is shorter than the predetermined time T (step B1). Here, the predetermined time T is a reference time to historically manage the result of base station search. Any record whose elapsed time after base station search P6 exceeds the predetermined time T is deleted by the control section 11. If the setting designates the predetermined time T as "0", the control section 11 uses only the newest result of base station search in determining whether to perform a handover.

The handover execution determiner 11G extracts a record corresponding to a base station whose signal strength P5 is the greatest of the extracted records (step B2). The base station corresponding to the record extracted in step B2 is a candidate for the destination of the handover. The handover execution determiner 11G compares the signal strength P5 of the signal from the candidate base station with the signal strength P5 of the signal from the currently associated first base station 2 (step B3).

If the signal strength P5 of the extracted base station is the greater, the handover execution determiner 11G determines the handover to the base station as necessary (Yes in step B3). Then, the control section 11 goes from the current operation to step A16 of FIG. 4 to execute handover. If the signal strength P5 of the currently associated base station is the larger (No in step B3), the handover execution determiner 11G determines that the execution of the handover is not necessary. Then the control section 11 proceeds with the process to step A1 of FIG. 4, and continues operating under the first base station 2.

According to the above, this device affords reduction of time to conduct handover, to thereby reduce the time duration of interruption in communication with the currently associated base station is shortened.

The second example of the process of determining whether to perform the handover is, as shown in the flowchart of FIG. 7, the process with the same totality as FIG. 6 with an exception of step C3 that replace with step B3 in FIG. 6. The same processes in FIG. 7 and FIG. 6 are affixed with common reference numerals.

In step C3, the signal strength P5 of the base station acquired in step B2 is compared with a sum of signal strength P5 of the currently associated first base station 2 and a predetermined threshold value TH4.

If the signal strength P5 of the base station extracted from the results of base station search is the larger (Yes in step C3), the handover execution determiner 11G determines the execution of handover as necessary, and the control section 11 proceed with the operation to step A16 of FIG. 4 to perform handover. If the sum of signal strength P5 of the first base station 2 and the predetermined threshold value TH4 is the greater (No in step C3), the handover execution determiner 11G determines that the handover is not necessary, and the control section 11 continues to operate under the first base station 2.

According to the above, the time duration of interruption of communication with the currently associated first base station 2 is shortened. Further, the handover can be performed in which a base station with sufficient signal strength P5, effecting good reception, is the destination of reconnection.

The third example of process for determining whether to execute the handover is, as shown in the flowchart of FIG. 8, the process with the same totality as FIG. 6 with the exception of determination step D0 added as the step preceding to step B1 and not appearing in FIG. 6. Similarly to the above, the same processes in FIG. 8 and FIG. 6 are affixed with common reference numerals.

In step D0 of FIG. 8, the handover execution determiner 11G compares the signal strength P5 of the currently associated first base station 2 with the predetermined threshold value TH5. If the signal strength P5 of the first base station 2 is the greater (Yes in step D0), the handover execution determiner 11G determines that the handover is not necessary, and the control section 11 continues to operate under the first base station 2. On the other hand, if the threshold value TH5 is the greater (No in step D0), the control section 11 executes the determination process of steps B1 to B3, similarly to FIG. 6.

According to the above, the time duration of interruption of communication with the currently associated first base station 2 is shortened.

On the other hand, if the signal strength P5 of the currently associated first base station 2 is sufficient, the control section 11 does not execute handover, thus reducing unnecessary execution of handover.

The process for determining whether to execute the handover may be a combination of the processes of FIGS. 7 and 8. In this case, the control section 11 can reduce the duration time of interruption in the communication with the currently associated first base station 2, and execute the handover so that a base station with sufficient signal strength P5, effecting good reception, is the destination of reconnection. Moreover, the control section 11 can reduce unnecessary execution of the handover.

Lastly, the process of determining the presence or absence of the destination of the handover in step A10 of FIG. 4 will be described with reference to FIG. 9. The same processes in FIG. 9 and FIG. 6 are affixed with common reference numerals.

Step A10 is a process of determination executed when the handover execution determiner 11G determines in step A4 that the signal strength P5 is smaller than the threshold value TH2.

Figure 9:
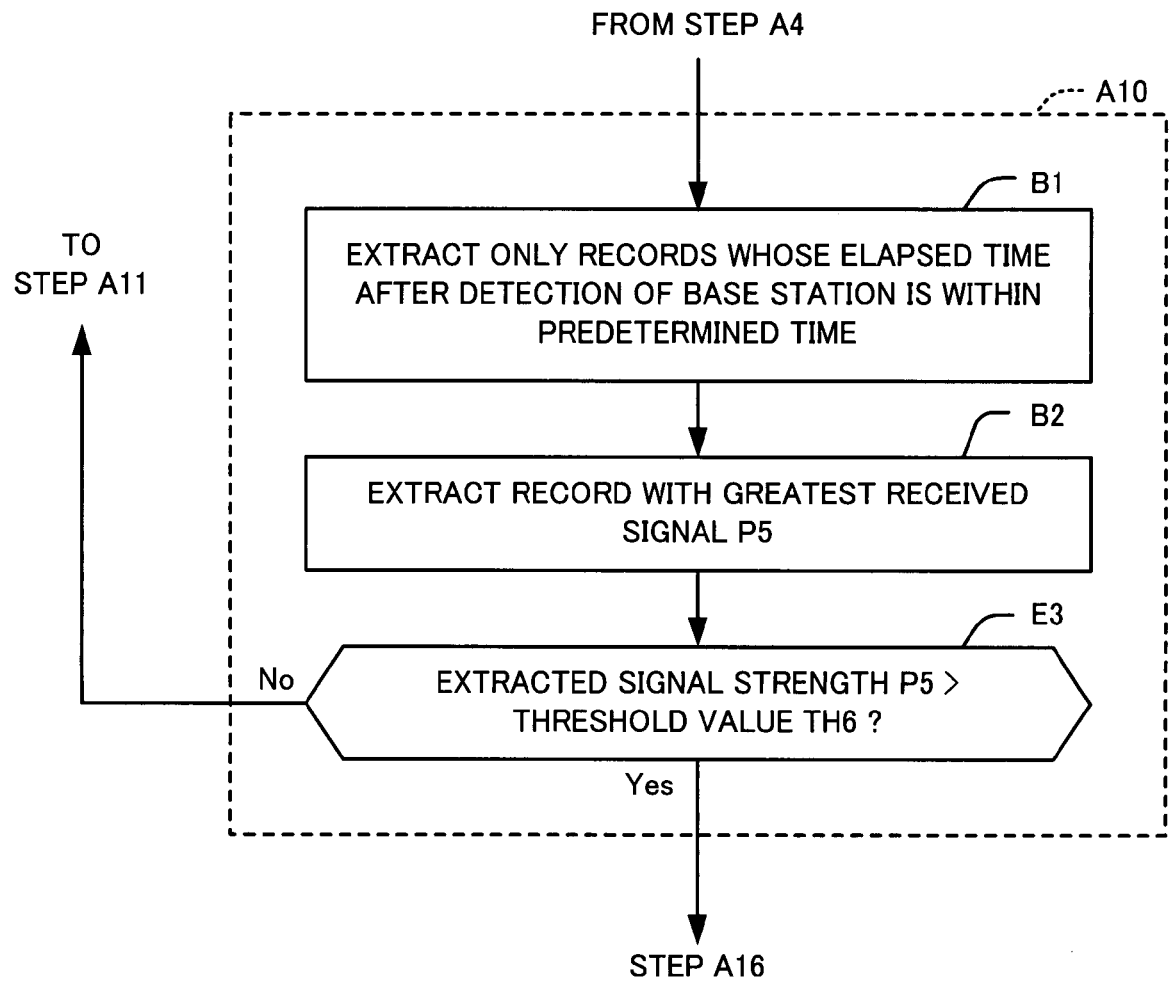
FIG. 9 is a flowchart showing a process in step A10 of FIG. 4 of determining the presence or absence of a destination of the handover.

When the process of flowchart of FIG. 9 is activated, similarly to the steps B1 and B2 of FIGS. 6 to 8, the control section 11 extracts a record whose lapsed time after the finish of the base station search is shorter than the predetermined length, from the results of base station search stored in the base station detection results storage area 124 (step B1). Then, the control section 11 extracts one whose signal strength P5 is the greatest (step B2).

The handover execution determiner 11H compares the signal strength P5 of the base station indicated by the record extracted in step B2 with the threshold value TH6 (step E3). If the signal strength P5 of the base station is the greater (Yes in step E3), the handover execution determiner 11H determines the base station as the destination of reconnection in the handover, and the control section 11 proceed with the process to step A16 in FIG. 4 to execute the handover. On the other hand, if the threshold value TH6 is the greater (No in step E3), the handover execution determiner 11H determines that there is no destination of reconnection of the handover, and the control section 11 execute the base station search based on all the base station search conditions, in accordance with the processes of steps A11 to A15.

In step A15, the base station search process may be terminated when a base station whose signal strength P5 is greater than the predetermined threshold value is detected before that the base station search processes in all of the base station search conditions selected by the search condition determiner 11D are finished. This enhance the effect of reducing the time needed for the base station search time.

The present invention can widely be applied to electronic devices provided with the wireless communication function, for example, cellular phones, PDAs, electronic cameras, electronic wrist watches, music recorders and players, and the like.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-310100 filed on Nov. 16, 2006 and including specification, claims, drawings and summary. The disclosure of the above Japanese Patent Application is incorporated herein by reference in its entirety.

What is claimed is:

1. A method for handover processing in wireless communication for a mobile electronic device, which includes a wireless communication unit configured for communicating by transmitting and receiving a wireless signal, to switch an associated wireless communication base station of the mobile electronic device from a first base station to a second base station, the method comprising:

a) acquiring base station information as to the first base station;
   b) determining a degree of necessity to search for the second base station that is other than the first base station, based on the acquired base station information as to the first base station;
   c) selecting some base station search conditions from among a plurality of base station search conditions stored in advance in accordance with the degree of necessity determined in the step b);
   d) searching for and detecting one or more base stations in accordance with the selected base station search conditions;
   e) determining whether to execute the handover processing based on base station information as to the one or more base stations detected in the step d) and the base station information as to the first base station; and
   f) selecting, upon determination to execute the handover processing in the step e), the second base station from among the one or more base stations detected in the step d) and switching the associated base station of the mobile electronic device to the second base station thus selected, wherein an interval between executions of the step a) is set based on a received signal strength of the wireless signal received from the first base station by the mobile electronic device, and the interval is set to be longer than a predetermined reference time if the received signal strength of the wireless signal received from the first base station is greater than a predetermined first received signal strength, and the interval is set to be shorter than the reference time if the received signal strength of the wireless signal received from the first base station is smaller than a predetermined second received signal strength.

2. The method according to claim 1, wherein the base station search conditions limit wireless communication channels used when the wireless communication unit performs a base station search.

3. The method according to claim 1, wherein the base station information of the first base station includes the received signal strength of the wireless signal received from the first base station by the mobile electronic device.

4. The method according to claim 3, wherein
   the degree of necessity is the received signal strength, and
   in the step c), a number of channels for searching for the second base station, which is one of the base station search conditions, is selected according to the received signal strength, whereby different conditions are selected from among the base station search conditions at every search in accordance with the degree of necessity.

5. The method according to claim 1, wherein, in the step e), a necessity to execute the handover processing is determined when a received signal strength of a wireless signal received by the mobile electronic device from the second base station is greater than the received signal strength of the wireless signal received thereby from the first base station.

6. The method according to claim 1, wherein, in the step e), a necessity to execute the handover processing is determined when a received signal strength of a wireless signal received from the second base station by the mobile electronic device is greater than a sum of the received signal strength of the wireless signal received from the first base station by the mobile electronic device and a predetermined received signal strength.

7. The method according to claim 1, wherein, in the step e), a necessity to execute the handover processing is determined when the received signal strength of the wireless signal received from the first base station by the mobile electronic device is smaller than a predetermined received signal strength, and a received signal strength of a wireless signal received from the second base station is greater than the received signal strength of the wireless signal received from the first base station.

8. The method according to claim 1, wherein, in the step e), the handover processing is determined to be necessary when the received signal strength of the wireless signal received from the first base station by the mobile electronic device is smaller than a predetermined received signal strength, and a received signal strength of a wireless signal received from the second base station by the mobile electronic device is greater than a sum of the received signal strength of the wireless signal received from the first base station and the predetermined received signal strength.

9. The method according to claim 1, wherein, in the step c), different conditions are selected from among the base station search conditions at every search in accordance with the degree of necessity.

10. A mobile electronic device comprising:
a wireless communication unit configured for transmitting and receiving a wireless signal to and from a base station to perform communication via the base station;
an information acquirer configured to acquire base station information as to a first base station with which the mobile electronic device associates;
a first determiner configured to determine a degree of necessity to search for a second base station that is other than the first base station, based on the acquired base station information as to the first base station;
a selector configured to select some base station search conditions from among a plurality of base station search conditions stored in advance in accordance with the degree of necessity determined by the first determiner;
a base station searcher configured to search for and detect base stations in accordance with the selected base station search conditions;
a second determiner configured to determine whether to execute handover processing based on base station information as to the base stations detected by the base station searcher and the base station information as to the first base station; and
an associator configured to select, upon determination by the second determiner that there is a necessity to execute the handover processing, the second base station from among the base stations detected by the base station searcher and switching the associated base station of the mobile electronic device from the first base station to the second base station,
wherein an interval between acquisitions of base station information by the information acquirer is set based on a received signal strength of the wireless signal received from the first base station by the mobile electronic device, and the interval is set to be longer than a predetermined reference time if the received signal strength of the wireless signal received from the first base station is greater than a predetermined first received signal strength, and the interval is set to be shorter than the reference time if the received signal strength of the wireless signal received from the first base station is smaller than a predetermined second received signal strength.

11. The method according to claim 10, wherein the selector selects different conditions from among the base station search conditions at every search in accordance with the degree of necessity.

12. A wireless communication handover system comprising
a mobile electronic device including:
a wireless communication unit configured for transmitting and receiving a wireless signal to and from a base station to perform communication via the base station;
an information acquirer configured for acquiring base station information as to a first base station with which the mobile electronic device associates;
a first determiner configured for determining a degree of necessity to search for a second base station that is other than the first base station, based on the acquired base station information as to the first base station;
a selector configured for selecting some base station search conditions from among a plurality of base station search conditions stored in advance in accordance with the degree of necessity determined by the first determiner;
a base station searcher configured for searching for and detecting base stations in accordance with the selected base station search conditions;
a second determiner configured for determining whether to execute handover processing based on base station information as to the base stations detected by the base station searcher and the base station information as to the first base station; and
an associator configured for selecting, upon determination by the second determiner that there is a necessity to execute the handover processing, the second base station from among the base stations detected by the base station searcher and switching the associated base station of the mobile electronic device from the first base station to the second base station thus selected;
the first base station with which the mobile electronic device associates before the associated base station being switched by the associator; and
the second base station with which the mobile electronic device associates after the associated base station being switched by the associator,
wherein an interval between acquisitions of base station information by the information acquirer is set based on a received signal strength of the wireless signal received from the first base station by the mobile electronic device, and
the interval is set to be longer than a predetermined reference time if the received signal strength of the wireless signal received from the first base station is greater than a predetermined first received signal strength, and the interval is set to be shorter than the reference time if the received signal strength of the wireless signal received from the first base station is smaller than a predetermined second received signal strength.

13. The method according to claim 12, wherein the selector selects different conditions from among the base station search conditions at every search in accordance with the degree of necessity.

* * * * *